United States Patent Office.

JESSE P. BATTERSHALL, OF NEW YORK, N. Y.

PROCESS OF MANUFACTURING GLYCERINE FROM SOAP-LIQUOR.

SPECIFICATION forming part of Letters Patent No. 251,992, dated January 3, 1882.

Application filed November 5, 1881. (No specimens.)

*To all whom it may concern:*

Be it known that I, JESSE PARK BATTERSHALL, of the city, county, and State of New York, have invented certain new and useful Improvements in Processes of Manufacturing Glycerine from Soap-Liquor, of which the following is a specification.

My invention relates more particularly to the utilizing of waste soap-liquor (which is now an almost worthless waste product) for the manufacture of glycerine.

My invention consists in the process of separating glycerine from waste soap-liquor by the neutralization of the alkalies therein contained, evaporation, the addition of certain chemicals, the removal of fat and rosin by suitable means, the use of the centrifugal machine, and distillation, as hereinafter set forth.

My invention also consists in the use of the centrifugal machine for the separation of glycerine from waste soap-liquor, as hereinafter set forth.

My invention also consists in the combination of the use of the centrifugal machine with the process of evaporation for the manufacture of glycerine from waste soap-liquor, as hereinafter described.

My invention also consists in the combination of the use of the centrifugal machine with the processes of evaporation and distillation for the manufacture of glycerine from waste soap-liquor, as hereinafter described.

My invention also consists in the combination of the use of the centrifugal machine with the processes of neutralization, evaporation, and distillation for the manufacture of glycerine from waste soap-liquor, as hereinafter described.

My invention also consists in the combination of the use of the centrifugal machine with means for dissolving and further freeing the products thereof from the salts which are dissolved therein in the manufacture of glycerine from waste soap-liquor.

My invention also consists in the combination of the use of the centrifugal machine and the passage of the products thereof through bone-black for the purpose of freeing the products thereof from any coloring-matter therein contained in the manufacture of glycerine from waste soap-liquor, as hereinafter described.

It also consists in the use of carbonate of lime, as hereinafter set forth, and in combination with the processes hereinafter set forth for the manufacture of glycerine from waste soap-liquor.

It also consists in the combination of the use of the centrifugal machine and means for separating the resin and fat from the products thereof in the manufacture of glycerine from waste soap-liquor, as hereinafter described.

In carrying out my invention I first take the waste soap-liquor as it is obtained from soap-manufacturers and introduce it into capacious evaporating-kettles or other suitable vessels, which are provided with coils of pipe made of any suitable metal, through which I cause superheated or ordinary steam to be passed or injected by any suitable means. I next carefully neutralize the free and carbonated alkalies (soda and potassa) by adding a solution of sulphuric acid in about the following proportions, viz., one part of water and one part of the sulphuric acid of commerce, (68° Baumé,) in about the proportion of two gallons of the diluted acid to every forty gallons of the waste soap-liquor. I may add this solution of sulphuric acid, &c., to the waste soap-liquor in its original bulk, or when it is reduced to one-half, say, of its original bulk by evaporation, as above described. I then pass superheated or ordinary steam through the coils of the pipe connecting with the evaporating-kettles, and the waste soap-liquor is concentrated to about one-tenth of its original volume. In case resin or fat is contained in the waste soap-liquor it is advisable to add a slight excess of the mixture of water and sulphuric acid to the same, and to remove the same—the resin or fat—by straining the concentrated liquor through cloth or any other suitable material made into bags or otherwise after it has been evaporated to about one-tenth of its original volume. I then add a small quantity of carbonate of lime to the strained soap-liquor, and it is further concentrated in the evaporating-kettles until, upon cooling, it assumes the consistency of a sirup or paste, which consists of a mixture of chlorides and sulphates of soda and potassa, sulphate and carbonate of lime, and glycerine. I then place the entire contents remaining in the evaporating-kettles in a centrifugal machine, such as is used for causing the separation of sugar from molasses. I then, by the ordinary or any suitable means, cause the centrifugal machine to rotate rapidly on its axis, thereby causing the removal of the glycerine contained therein. By this means the greater portion of the salts of soda, potassa, and lime referred to above are retained in the interior of the centrifugal machine, the glycerine being thrown off by the rapid rotation of the machine. As the glycerine thus obtained has a certain quantity of salts in solution, I next place it into a still, into which superheated steam can be injected, and the product then distilled over a moderate fire. The pipe connecting with the neck of the glycerine-still is provided with a system of traps which permit of the separate condensation of the glycerine and water vapors.

I prefer sometimes to treat the glycerine as it issues from the centrifugal machine with a small quantity of methylic or ethylic alcohol in order to dissolve the glycerine and further free it from the salts which are dissolved therein. In this case the alcoholic solution is filtered from the remaining salts and the alcohol removed therefrom by distillation. The residual glycerine is then subjected to distillation, as hereinbefore set forth, and the alcohol thus removed may be used over and over again as long as it lasts. I also pass the glycerine through bone-black in case it possesses a very dark color, either as it issues from the centrifugal machine or after its final distillation.

While I am aware that glycerine has been obtained from waste soap-liquor by neutralizing with sulphuric acid, removing the excess of that acid with carbonate of baryta, evaporating the filtrate to a sirup, digesting it for several days with ethylic alcohol, separating the alcohol, and evaporating, and has also been obtained from the same source by evaporation and subsequent treatment with superheated steam, I am not acquainted with any process in which the several features of the method described in the specification herewith presented are combined so as to render them effective. The first process hereinabove last referred to is too expensive for use on a large scale, and the second process causes too great decomposition of the glycerine, owing to the very imperfect removal of the salts previous to its distillation.

It will be seen that by my invention I provide a cheaper, quicker, and more effective means of separating glycerine and manufacturing the same from waste soap-liquor than has been hitherto known to the public.

What I claim as my invention, and desire to secure by Letters Patent, is—

1. In the manufacture of glycerine from waste soap-liquor, the processes of neutralization, evaporation, addition of carbonate of lime, means for removing rosin and fat, use of the centrifugal machine, and distillation, substantially as described.

2. The application of the centrifugal machine for the separation of glycerine from waste soap-liquor, substantially as hereinabove described.

3. In the manufacture of glycerine from waste soap-liquor, the use of the centrifugal machine in combination with the process of evaporation, substantially as hereinabove described.

4. In the manufacture of glycerine from waste soap-liquor, the combination of the use of the centrifugal machine with the process of evaporation and distillation, substantially as herein set forth.

5. In the manufacture of glycerine from waste soap-liquor, the combination of the use of the centrifugal machine with the process of neutralization, evaporation, and distillation, substantially as hereinabove described.

6. In the manufacture of glycerine from waste soap-liquor, the combination of the use of the centrifugal machine with the use of methylic or ethylic alcohol, substantially as hereinabove described.

7. In the manufacture of glycerine from waste soap-liquor, the use of the centrifugal machine with means for clarifying the products thereof, substantially as herein described.

8. In the manufacture of glycerine from waste soap-liquor, the use of carbonate of lime, substantially as hereinabove described.

9. In the manufacture of glycerine from waste soap-liquor, the combination of the use of the centrifugal machine with the process of separating resin and fat by straining through cloth filter-bags, substantially as hereinabove described.

JESSE PARK BATTERSHALL.

Witnesses:
W. R. DENSLOW,
OWEN PRENTISS.